United States Patent Office 2,968,478
Patented Jan. 17, 1961

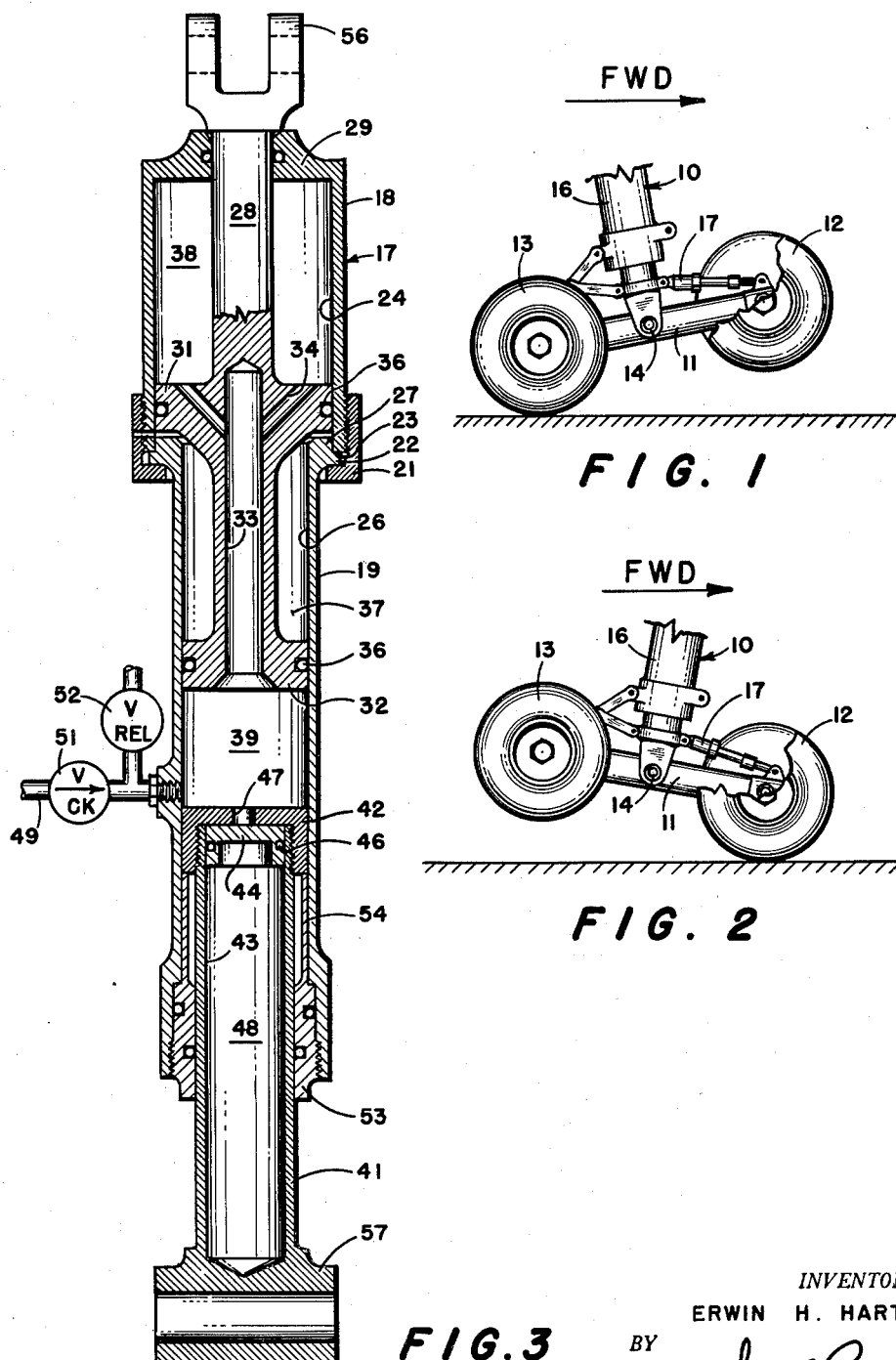

2,968,478

CENTERING AND SNUBBING DEVICE

Erwin H. Hartel, Cleveland, Ohio, assignor to Cleveland Pneumatic Industries, Inc., a corporation of Ohio Filed Aug. 10, 1956, Ser. No. 603,431

4 Claims. (Cl. 267—64)

This invention relates to fluid spring devices and more particularly to a new and improved fluid spring having a normal or neutral position from which it is capable of both extension and compression.

It is an important object of this invention to provide a new and improved fluid spring mechanism capable of absorbing both extension and compression loads.

It is another important object of this invention to provide a new and improved fluid spring which normally assumes a neutral position and which can be compressed or extended from the neutral position.

It is still another object of this invention to provide a fluid spring device adapted for use on aircraft landing gears which resiliently assumes a neutral position and is capable of resiliently absorbing both extension and compression loads.

Further objects and advantages will appear from the following description and drawings, wherein:

Figures 1 and 2 are fragmentary views of an aircraft landing gear on which a fluid spring according to this invention is installed showing one application for which the spring is particularly suited; and, Figure 3 is an enlarged longitudinal section of a fluid spring incorporating this invention. In many installations, it is necessary to provide a spring device which resiliently assumes a normal or neutral position and is capable of extension as well as compression. Such as installation is shown in Figures 1 and 2 wherein an aircraft landing gear 10 is provided with a horizontal extending truck 11 having wheels 12 and 13 journaled on either end thereof. The truck 11 is pivoted on the main strut 16 as at 14 so that both wheels 12 and 13 can be brought into contact with the ground regardless of the landing attitude of the aircraft. A fluid spring device 17 is pivotally connected between the strut 16 and the truck 11 to normally hold the truck in the neutral position but permit pivotal motion of the truck in either direction from this neutral position.

In Figure 1 the elements are shown in the position they would assume if the aircraft approaches the ground with a nose high attitude and Figure 2 shows the position the elements assume if the aircraft approached the ground with a nose down attitude. The spring device 17 insures that the truck 11 will assume a predetermined position relative to the strut 16 when the aircraft is airborne so that it will properly fit into the well within the aircraft when the landing gear is retracted but it permits pivotal motion of the truck 11 upon impact with the ground so that all the wheels can assume their portion of the load. The spring device 17 serves this purpose by resiliently maintaining the truck 11 in the predetermined position until it is pivoted by the wheel loads created by engagement of the wheels 12 and 13 with the ground. The pivotal motion of the truck 11 in the case shown in Figure 1 would be clockwise while the pivotal motion of the situation shown in Figure 2 would be counterclockwise. Therefore, the spring must be able to compress and extend from a normal or neutral position.

Reference should now be made to Figure 3 for the specific structure of a preferred spring according to this invention. The spring 17 includes a cylinder assembly formed of a first cylinder body member 18 and a second cylinder body member 19 which are connected together by a gland nut 21 which securely holds a flange 22 on the second body member 19 against an end wall 23, on the first cylinder body member 18. The first body member 18 is formed with a cylinder bore 24 and the second body member 19 is formed with a second smaller co-axial cylinder bore 26. The two bores 24 and 26 are connected by a radial shoulder 27 forming the end of the second body member 19. A differential piston 28 extends into the cylinder through an aperture end wall 29 formed on the first body member 18. The differential piston is provided with first and second axially spaced piston head portions 31 and 32 which engage and are slidable along the first cylinder bore 24 and the second cylinder bore 26 respectively. The two cylinder heads 31 and 32 are sufficiently spaced from each other so that the movement of the differential piston 28 through its full travel can be accommodated while maintaining the head portions in their respective cylinder bores. The differential piston is also formed with passages 33 and 34 connecting opposed sides of the piston heads 31 and 32. Resilient seals 36 on the piston heads 31 and 32 engage the walls of the cylinder bores 24 and 26 so that a zone 37 around the differential piston 28 between the piston heads 31 and 32 is isolated from a chamber 38 on one side of the piston head 31 and form a chamber 39 on the opposite side of the piston head 32.

A hollow piston 41 extending into the other end of the cylinder body 19 is provided with a piston head 42 which engages the walls of the second cylinder bore 26. The piston head 42 is removable threaded on to the hollow piston 41 to provide access to a central bore 43 formed in the hollow piston 41. A floating piston 44 positioned within the bore 43 is provided with a seal 46 which prevents leakage past the floating piston 44. The piston head 42 is formed with an aperture 47 which provides fluid communication between the chamber 39 and one side of the floating piston 44 and the floating piston 44 cooperates with the bore 43 to define a variable volume chamber 48 isolated from the chamber 39 by a floating piston 44. A pressure line 49 is connected to a source of liquid under pressure and to the chamber 39 through a check valve 51 which permits flow of liquid into the chamber 39 but prevents flow in the opposite direction. A suitable relief valve 52 is also connected to the chamber 39 to release the pressure within the chamber 39 if it exceeds a predetermined value.

When the floating piston 44 is positioned within the bore 43, air is trapped within the chamber 48. The hollow piston 41 is then placed within the second cylinder body 19 and a gland member 53 is threaded into the end of the second bore member 19. Liquid under pressure is then introduced into the chamber 39 through the pressure line 49 until both of the chambers 39 and 38 are completely filled with liquid. The liquid can be pressurized to essentially any desired pressure, the exact pressure being determined by the particular application of the fluid spring. When the chamber 39 is filled with liquid, the floating piston 44 moves into the bore 43 reducing the volume of the chamber 48 and compressing the air trapped therein. Since the two chambers 38 and 39 are connected by the passages 33 and 34, the pressure within the two chambers is equalized and the air in the chamber 48 which is then compressed, maintains the liquid under pressure. The pressure of the liquid within the chamber 39 acts on the piston head 42 and urges it into engagement with a stop skirt 54 formed on the gland member 53. The liquid within the chamber 39 also acts on the piston head 32 urging it in the opposite direction. However, the liquid within the chamber 38 acts on the piston head 31 and produces a force opposing the action of the liquid on the piston head 32. Since the area of the piston 31 is greater than the area of the piston head 32 a resulting force operates on the differential piston 28 which is equal to the differential area between the piston heads 31 and 32 times the pressure of the liquid within the chambers 38 and 39. This resulting force urges the piston head 31 into engagement with the shoulder 27. Thus the differential piston 28 is urged in a direction into the cylinder and the hollow piston 41 is urged in a direction out of the cylinder.

If a tension force is applied between mounting portions 56 and 57 formed on the differential piston 28 and the hollow piston 41 respectively, the differential piston 28 will move axially out of the cylinder against the resulting force of the liquid on the two piston heads 31 and 32. This results in a decrease in the volume of the chamber 38 and an increase of volume of the chamber 39. Since the volume of the chamber 38 decreases at a rate greater than the volume of the chamber 39 increases, the total volume for the liquid within the two chambers will be decreased causing the liquid to flow through the aperture 47 compressing the air within the chamber 48 to a higher pressure. Conversely, if a force is applied to the mounting portions 56 and 57 tending to move them together, the hollow piston 41 will be moving axially into the cylinder against the force of the liquid acting on the piston head 42. This of course, decreases the volume of the chamber 39 and causes liquid to flow into the aperture 47 and move the floating piston 44 further into the bore 43 thereby increasing the pressure of the air within the chamber 48. It is apparent therefore, that movement of the mounting portions 56 and 57 in either direction from the neutral position shown in Figure 3 results in a compression of the air within the chamber 48. Therefore, the fluid spring 17 is capable of being compressed or extended from the normal or neutral position shown in Figure 3.

It should be noted that all the fluid seals are exposed to the liquid on at least one side so that none of the seals run dry. Therefore, all of the seals are lubricated by the liquid within the spring. The seal 46 will not tend to leak because the only pressure differential across the seal is that pressure differential needed to overcome friction and move the floating piston 44. Since this pressure differential is small, the air will not escape from the chamber 48. In order to assure that the spring will always function correctly, the chamber 39 is connected to a source of liquid under pressure on the aircraft so that any leakage will automatically be replaced and the spring will always be charged to the proper pressure. It may be desirable to provide the relief valve 52 to prevent over pressure which might occur if the impact of landing is too rapid or if the air is lost due to a fracture or crack in the hollow piston 41. It is recognized that such a possibility is very remote, but if the relief valve 52 is provided, the device will function even under conditions which would normally cause failure.

Although a preferred embodiment of this invention is illustrated, it will be realized that various modifications of the structural details may be made without departing from the mode of the operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A fluid spring comprising a cylinder body formed with a first bore and a co-axial smaller diameter second bore joined at the adjacent ends by a shoulder, a differential member formed with a first head portion slidable in said first bore and a second head portion slidable in said second bore, a separate piston slidable in said second bore, said first bore and first head portion co-operating to define a portion of a first chamber, said second head portion and said piston co-operating to define a second chamber within said second bore, passage means providing fluid communication between said chambers, and fluid under pressure filling both of said chambers, said first head portion having a larger effective area than said second head portion whereby said differential member is urged in a direction which tends to move said first head portion toward said shoulder and said piston is urged in a direction away from said shoulder.

2. A fluid spring comprising a cylinder body formed with a first bore and a co-axial smaller diameter second bore joined at the adjacent ends by a shoulder, a differential piston formed with a first head portion slidable in said first bore and a second head portion slidable in said second bore, a separate second piston slidable in a second bore, said first bore and first head portion co-operating to define a portion of a first chamber, said second head portion and second piston co-operating to define a second chamber within said second bore, passage means providing fluid communication between said chambers, and liquid in both of said chambers pressurized by compressed gas, said first head portion having a larger effective area than said second head portion whereby said differential piston is urged in a direction which tends to move said first head portion toward said shoulder and said piston is urged in a direction away from said shoulder.

3. A fluid spring comprising a cylinder body formed with a first bore and a co-axial smaller diameter second bore joined at the adjacent ends by a shoulder, a differential member formed with a first head portion slidable in said first bore and a second head portion slidable in said second bore, a hollow piston slidable in said second bore, said first bore and first head portion co-operating to define a portion of a first chamber, said second head portion and said hollow piston co-operating to define a second chamber within said second bore, passage means in said differential member providing fluid communication between said chambers, liquid filling both of said chambers, a floating piston in said hollow piston defining part of a third chamber filled with gas under pressure, the side of said floating piston remote from said third chamber being exposed to and pressurizing said liquid under the influence of said gas, said first head portion having a larger effective area than said second head portion whereby said differential member is urged in a direction which tends to move said first head portion toward said shoulder and said piston is urged in a direction away from said shoulder.

4. A fluid spring comprising a cylinder body assembly formed with a first bore and a co-axial smaller diameter second bore joined at adjacent ends by a radial shoulder, a differential member extending into one end of said assembly formed with first and second piston portions slidable in said first and second bores respectively, a hollow piston formed with a third bore extending into the other end of said body assembly slidable in said second bore, an apertured piston head on said hollow piston providing communication between said second and third bore, said first piston portion and said first bore co-operating to define a portion of a first liquid filled chamber, said second piston portion and said piston head defining a second liquid filled chamber in said second bore, a floating piston freely slidable in said third bore defining in co-operation therewith a third chamber isolated from said second chamber by said floating piston, said differential member being formed with passages providing fluid communication between said first and second chambers, gas under pressure filling said third chamber pressurizing the liquid in said first and second chambers, said first head portion having a larger effective area than said second head portion whereby both said differential members and hollow piston are urged by said liquid under pressure axially in the same direction relative to said cylinder assembly.

References Cited in the file of this patent

UNITED STATES PATENTS

| | | |
|---|---|---|
| 2,707,119 | Bobrick | Apr. 26, 1955 |
| 2,774,446 | Bourcier De Carbon | Dec. 18, 1956 |

FOREIGN PATENTS

| | | |
|---|---|---|
| 256,094 | Germany | Jan. 31, 1913 |